(12) United States Patent
Kojima

(10) Patent No.: US 7,656,454 B2
(45) Date of Patent: Feb. 2, 2010

(54) IMAGE PICKUP APPARATUS INCLUDING ADJUSTABLE REFLECTION SURFACE

(75) Inventor: Kazuhiko Kojima, Osaka (JP)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 11/860,839

(22) Filed: Sep. 25, 2007

(65) Prior Publication Data

US 2008/0079838 A1 Apr. 3, 2008

(30) Foreign Application Priority Data

Oct. 3, 2006 (JP) ............................. 2006-271651

(51) Int. Cl.
*H04N 5/225* (2006.01)
(52) U.S. Cl. ...................... 348/344; 348/374
(58) Field of Classification Search ............... 348/345, 348/335, 337, 341, 344, 374, 375; 396/331, 396/186, 200, 352, 356, 378, 385, 296, 386, 396/374, 354; 359/201.1, 207.1, 211.1, 838, 359/857, 872, 873
See application file for complete search history.

(56) References Cited

U.S. PATENT DOCUMENTS

| | | | | |
|---|---|---|---|---|
| 3,590,683 A | * | 7/1971 | Hiruma | .................. 396/383 |
| 3,651,735 A | * | 3/1972 | Hiruma | .................. 396/383 |
| 6,041,195 A | | 3/2000 | Honda et al. | |

FOREIGN PATENT DOCUMENTS

| | | |
|---|---|---|
| JP | 59-69716 | 4/1984 |
| JP | 2-204730 | 8/1990 |
| JP | 3-10231 | 1/1991 |
| JP | 10-039408 | 2/1998 |
| JP | 2000-13663 | 1/2000 |
| JP | 2001-125173 | 5/2001 |
| JP | 2001-133846 | 5/2001 |
| JP | 2001-281751 | 10/2001 |
| JP | 2002-23245 | 1/2002 |
| JP | 2002-090814 | 3/2002 |
| JP | 2005-006217 | 1/2005 |
| JP | 2005-311764 | 11/2005 |
| JP | 2006-11025 | 1/2006 |

* cited by examiner

*Primary Examiner*—Lin Ye
*Assistant Examiner*—Nelson D. Hernández Hernández
(74) *Attorney, Agent, or Firm*—Oblon, Spivak, McClelland, Maier & Neustadt, L.L.P.

(57) ABSTRACT

An image pickup apparatus includes a finder optical system capable of guiding an observation beam to a finder window, the observation beam being a beam traveling from a photographing optical system and reflected by a main reflecting surface; and a first image pickup device configured to detect the observation beam and generate an image signal. The finder optical system has a first reflecting surface that reflects the observation beam. The first reflecting surface can change a reflection angle of the observation beam. A path of the observation beam can be switched between a first optical path and a second optical path by changing the reflection angle of the first reflecting surface. The first optical path is reflected by the first reflecting surface and directed toward the finder window, while the second optical path is reflected by the first reflecting surface and directed toward the first image pickup device.

8 Claims, 9 Drawing Sheets

IMAGE PICKUP APPARATUS INCLUDING ADJUSTABLE REFLECTION SURFACE

CROSS REFERENCES TO RELATED APPLICATIONS

The present invention contains subject matter related to Japanese Patent Application JP 2006-271651 filed in the Japanese Patent Office on Oct. 3, 2006, the entire contents of which are incorporated herein by reference.

BACKGROUND OF THE INVENTION

1. Field of the Invention

The present invention relates to an image pickup apparatus, such as a digital camera.

2. Description of the Related Art

There is technology which realizes a live view function in a single-lens reflex camera. The live view function allows time-series images of a subject to be sequentially displayed on a liquid crystal display or the like. In other words, the live view function allows subject images to be displayed in a movie-like manner on a liquid crystal display or the like.

For example, Japanese Unexamined Patent Application Publications Nos. 2000-13663 and 2006-11025 describe a technique in which a beam splitter or a half mirror is disposed in an optical path of a finder optical system, a beam from a subject is split by the beam splitter or half mirror into a first component directed toward an image pickup device and a second component directed toward a finder window, and a live view function is realized by guiding the first component to the image pickup device.

In this technique, however, since a beam from the subject is split by the beam splitter or half mirror into the first and second components as described above, there is a problem in that a subject image observed as the second component through the finder window is dark.

Japanese Unexamined Patent Application Publication No. 2001-133846 describes a technique for solving such a problem. In this technique, an image pickup device for live view is provided separately from that for image pickup (i.e., for still image recording). Additionally, in a finder optical path near an eyepiece, a movable reflecting mirror capable of moving back and forth with respect to the finder optical path is disposed. Then, by moving the reflecting mirror back and forth with respect to the finder optical path, a beam from a subject can be selectively directed toward either the eyepiece or image pickup device for live view.

SUMMARY OF THE INVENTION

However, in the technique described in Japanese Unexamined Patent Application Publication No. 2001-133846, it is necessary to provide, in the finder optical path near the eyepiece of a finder optical system, the reflecting mirror movable with respect to the finder optical path, as well as existing optical components. In particular, if a plurality of lenses are provided as an eyepiece for diopter arrangement or the like, many components are disposed in the optical path near the eyepiece. Therefore, it is very difficult to avoid an increase in the size of the corresponding part of the apparatus.

The present invention addresses the above-identified and other problems by providing an image pickup apparatus capable of realizing live view display without addition of a reflecting mirror that is movable back and forth with respect to an optical path of a finder optical system, and also capable of allowing the user to view a bright subject image through an optical finder.

According to an embodiment of the present invention, there is provided an image pickup apparatus including a finder optical system capable of guiding an observation beam to a finder window, the observation beam being a beam traveling from a photographing optical system and reflected by a main reflecting surface; and a first image pickup device configured to detect the observation beam and generate an image signal. The finder optical system has a first reflecting surface that reflects the observation beam. The first reflecting surface can change a reflection angle of the observation beam. A path of the observation beam can be switched between a first optical path and a second optical path by changing the reflection angle of the first reflecting surface. The first optical path is reflected by the first reflecting surface and directed toward the finder window, while the second optical path is reflected by the first reflecting surface and directed toward the first image pickup device.

The present invention makes it possible to realize live view display without further requiring, in an optical path of a finder optical system, a reflecting mirror that is movable back and forth with respect to the optical path. Also, the present invention allows the user to view a brighter subject image through an optical finder, as compared to the case where the amount of light reaching a finder window is considerably reduced because an observation beam is split by the beam splitter or half mirror into a component directed toward an image pickup device and a component directed toward the finder window.

DESCRIPTION OF THE PREFERRED EMBODIMENTS

Embodiments of the present invention will now be described with reference to the drawings.

1. First Embodiment (1-1. Configuration Overview)

Figure 1:
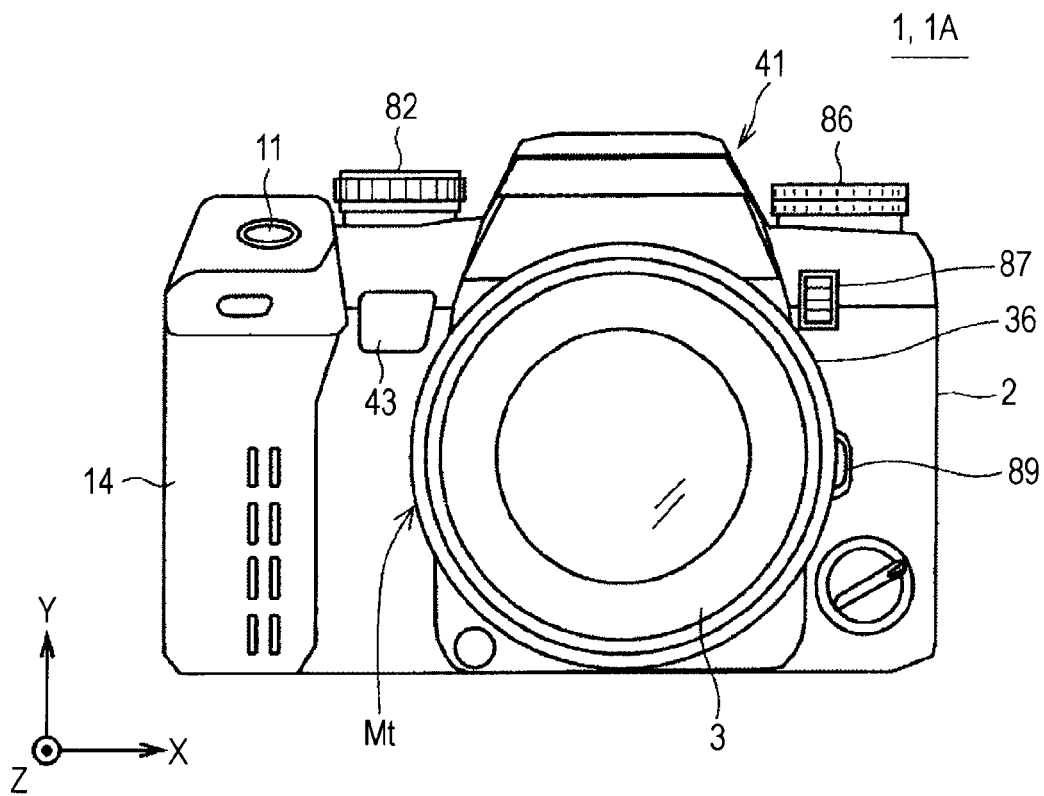
FIG. 1 is a front external view of an image pickup apparatus according to a first embodiment of the present invention.
Figure 2:
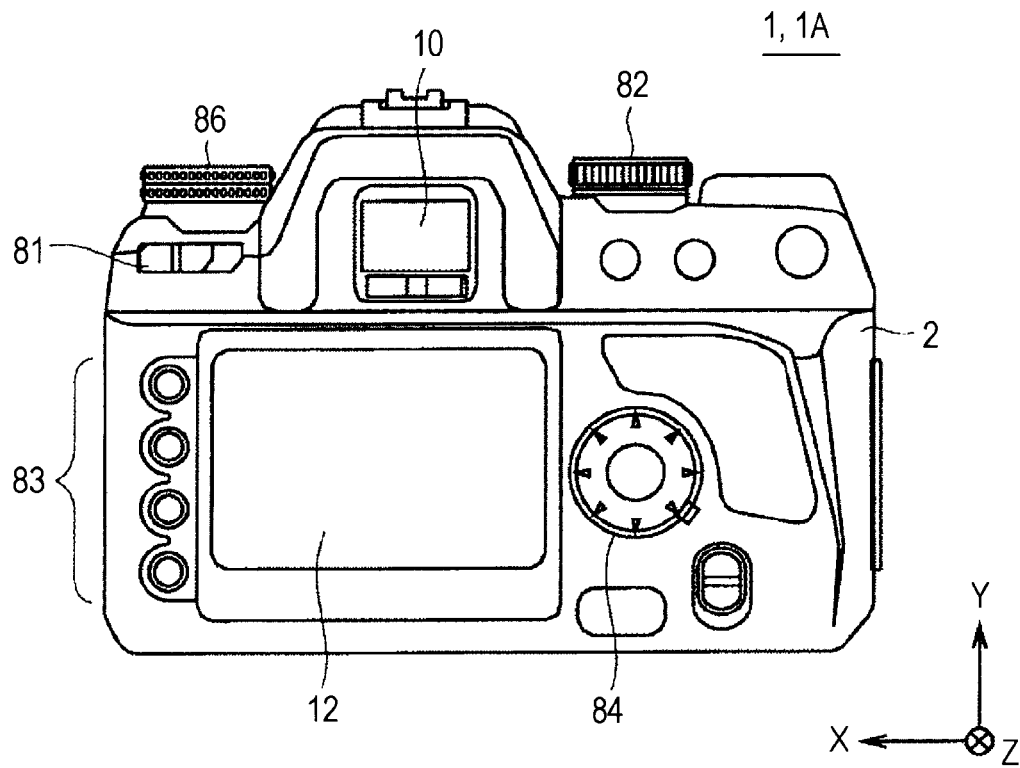
FIG. 2 is a rear external view of the image pickup apparatus.

FIG. 1 and FIG. 2 illustrate external configurations of an image pickup apparatus 1 (1A) according to a first embodiment of the present invention. FIG. 1 is a front external view of the image pickup apparatus 1, while FIG. 2 is a rear external view of the image pickup apparatus 1. The image pickup apparatus 1 is a single-lens reflex digital camera with interchangeable lenses.

As illustrated in FIG. 1, the image pickup apparatus 1 includes a camera body 2 to or from which an interchangeable photographing lens unit (interchangeable lens) 3 can be attached or removed.

The photographing lens unit 3 primarily includes a camera cone 36, a lens group (photographing optical system) 37 (see FIG. 3), and an aperture member. The lens group 37 and the aperture member are provided inside the camera cone 36. The lens group 37 includes a focus lens which moves along the optical axis to change the focal position.

The camera body 2 includes an annular mount Mt on which the photographing lens unit 3 is mounted. The mount Mt is located substantially at the center of the front face of the camera body 2. A button 89 for attaching or removing the photographing lens unit 3 to or from the camera body 2 is provided near the mount Mt.

When viewed from the front, the camera body 2 has a mode selection dial 82 and a control value setting dial 86 located in the upper-left part and upper-right part, respectively, of the camera body 2. The mode selection dial 82 can select various modes for the camera, including various photographing modes (e.g., portrait photographing mode, landscape photographing mode, and full-auto photographing mode), playback mode for reproducing photographed images, and communication mode for sending and receiving data to and from an external device. The control value setting dial 86 can set control values for the various photographing modes.

A grip 14 for the photographer to hold the camera is located at the left end of the front face of the camera body 2. A release button 11 for instructing start of exposure is provided on the upper surface of the grip 14. A battery compartment and a card slot are provided inside the grip 14. For example, four size-AA dry cells serving as a power source for the camera are placed in the battery compartment. A memory card 90 (see FIG. 3) for recording image data of photographed images is removably placed in the card slot.

A press of the release button 11 is detectable in two different levels, a half-pressed state (S1 state) and a fully-pressed state (S2 state). When the release button 11 is pressed halfway into S1 state, a preparing operation (e.g., autofocus (AF) control operation or automatic exposure (AE) control operation) for obtaining a subject's still image (i.e., actual photographic image) to be recorded is performed. When the release button 11 is further pressed into S2 state, a photographing operation for the actual photographic image is performed. The photographing operation involves a series of steps in which an image pickup device 5 (described below) is used to perform an exposure operation about a subject image (i.e., an optical image of a subject) and then predetermined image processing is performed on an image signal obtained by the exposure operation.

Referring to FIG. 2, a finder window (eyepiece window) 10 is provided substantially at the center of the upper part of the rear face of the camera body 2. By looking through the finder window 10, the photographer can view a subject optical image guided from the photographing lens unit 3 and determine the composition. That is, the photographer can determine the composition using an optical finder.

In the image pickup apparatus 1 of the first embodiment, live view images displayed on a rear monitor 12 (described below) may also be used to determine the composition. By rotating the selector dial 87 (see FIG. 1), the operator can select either a composition determining operation through the use of the optical finder or live view display. This selecting operation will be described in detail below.

Referring to FIG. 2, the rear monitor 12 is provided substantially at the center of the rear face of the camera body 2. The rear monitor 12 is, for example, a color liquid crystal display (LCD). The rear monitor 12 is capable of displaying a menu screen for setting photographing conditions or the like and displaying, in a playback mode, a photographed image recorded in the memory card 90. If the photographer selects to determine the composition through the use of live view display instead of the optical finder, a plurality of time-series images (i.e., moving images) obtained by an image pickup device 7 (described below) are displayed on the rear monitor 12 as live view images.

A main switch 81 provided to the upper-left of the rear monitor 12 is a two-position slide switch. Sliding the main switch 81 to OFF position (or to the left in FIG. 2) turns the power off, while sliding the main switch 81 to ON position (or to the right in FIG. 2) turns the power on.

A direction selecting key 84 having a circular operation button is provided to the right of the rear monitor 12. Presses of the operation button in four directions (up, down, left, and right) and other four directions (upper-right, upper-left, lower-right, and lower-left) are individually detected. Besides the detection of the presses in the eight directions described above, a press of a push button at the center can be detected.

A setting button group 83 including a plurality of buttons is provided to the left of the rear monitor 12. The setting button group 83 is used to make settings on the menu screen, delete images, and the like.

(1-2. Functional Block)

Figure 3:
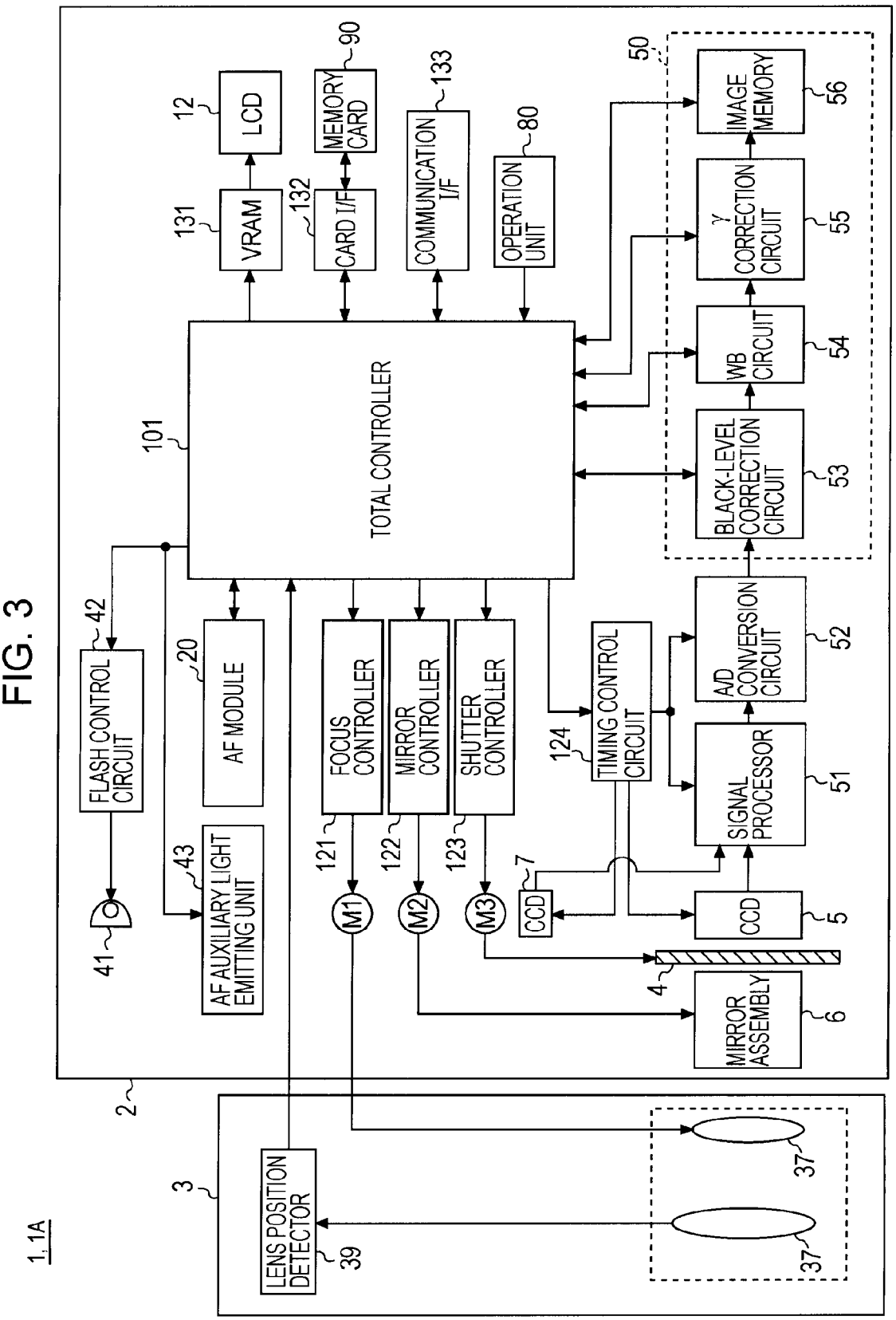
FIG. 3 is a functional block diagram of the image pickup apparatus.

FIG. 3 is a block diagram illustrating a functional configuration of the image pickup apparatus 1. An overview of functions of the image pickup apparatus 1 will now be described with reference to FIG. 3.

As illustrated in FIG. 3, the image pickup apparatus 1 includes an operation unit 80, a total controller 101, a focus controller 121, a mirror controller 122, a shutter controller 123, a timing control circuit 124, and a digital signal processing circuit 50.

The operation unit 80 includes various switches and buttons including the release button 11 (see FIG. 1). In response to a user's input operation of the operation unit 80, the total controller 101 performs various operations.

The total controller 101 is a microcomputer which primarily includes a central processing unit (CPU), memory, and read-only memory (ROM). The total controller 101 reads a program stored in the ROM and causes the CPU to execute the program, thereby performing various functions. For example, the total controller 101 performs a focus control operation, which involves control of a focus lens position, in cooperation with an AF module 20, the focus controller 121, and the like. According to an in-focus state of the subject detected by the AF module 20, the total controller 101 performs an AF operation using the focus controller 121. By using light entered through a mirror assembly 6, the AF module 20 can detect an in-focus state of the subject according to an in-focus state detecting method, such as a phase difference method.

On the basis of a signal input from the total controller 101, the focus controller 121 generates a control signal to drive a motor M1, thereby moving the focus lens included in the lens group 37 of the photographing lens unit 3. The position of the focus lens is detected by a lens position detector 39 in the photographing lens unit 3. Then, data representing the position of the focus lens is transmitted from the lens position detector 39 to the total controller 101. Thus, the focus controller 121, the total controller 101, and the like control the movement of the focus lens along the optical axis.

The mirror controller 122 controls switching between a "mirror-up state" where the mirror assembly 6 is retracted from the optical path and a "mirror-down state" where the mirror assembly 6 blocks the optical path. On the basis of a signal input from the total controller 101, the mirror controller 122 generates a control signal to drive a motor M2, thereby allowing switching between the mirror-up state and mirror-down state.

The shutter controller 123 generates a control signal on the basis of a signal input from the total controller 101 and drives a motor M3, thereby controlling opening and closing of a shutter 4.

The timing control circuit 124 performs timing control for the image pickup device 5 and the like.

The image pickup device 5 (which will here be referred to as charge-coupled device (CCD) or simply as CCD) converts an optical image of the subject into an electric signal by photoelectric conversion, and generates an image signal representing an actual photographic image (i.e., generates an image signal to be recorded). The image pickup device 5 is also expressed as an image pickup device for obtaining an image to be recorded.

In response to a drive control signal (accumulation start signal or accumulation end signal) input from the timing control circuit 124, the image pickup device 5 performs exposure of a subject image focused on a light detecting surface (i.e., accumulates electric charge obtained by photoelectric conversion) and generates an image signal representing the subject image. Also, in response to a readout control signal input from the timing control circuit 124, the image pickup device 5 outputs the image signal to a signal processor 51. A timing signal (synchronizing signal) from the timing control circuit 124 is input to the signal processor 51 and to an analog-to-digital (A/D) conversion circuit 52.

The image signal obtained by the image pickup device 5 is subjected to predetermined analog signal processing by the signal processor 51 and converted to digital image data (image data) by the A/D conversion circuit 52. This image data is input to a digital signal processing circuit 50.

The digital signal processing circuit 50 performs digital signal processing on the image data input from the A/D conversion circuit 52 to generate image data representing a picked-up image. The digital signal processing circuit 50 includes a black-level correction circuit 53, a while balance (WB) circuit 54, a gamma (γ) correction circuit 55, and an image memory 56.

The black-level correction circuit 53 corrects, to a reference black level, the black level of each of pixel data items constituting the image data output by the A/D conversion circuit 52. The WB circuit 54 adjusts the white balance of an image. The γ correction circuit 55 performs gradation conversion of a picked-up image. The image memory 56 temporarily stores generated image data and is accessible at a high speed. The image memory 56 has enough capacity to store a plurality of frames of image data.

In photographing, the image data temporarily stored in the image memory 56 is subjected to appropriate image processing (e.g., compression) by the total controller 101, transmitted through a card interface (I/F) 132, and stored in the memory card 90.

The image data temporarily stored in the image memory 56 is appropriately transferred by the total controller 101 to a video random access memory (VRAM) 131 and further to the rear monitor 12, on which an image based on the transferred image data is displayed. Thus, confirmation display (or after view) for confirming a photographic image, playback display for reproducing a photographed image, and the like are realized.

The image pickup apparatus 1 further includes an image pickup device 7 (see also FIG. 4) as well as the image pickup device 5. The image pickup device 7 serves as an image pickup device for obtaining so-called live view images (moving images). The image pickup device 7 has a similar configuration to that of the image pickup device 5. However, since it is sufficient for the image pickup device 7 to have enough resolution for generating image signals (moving images) for live view display, the number of pixels included in the image pickup device 7 is typically smaller than that of pixels included in the image pickup device 5.

Signal processing similar to that performed on the image signal obtained by the image pickup device 5 is performed on the image signal obtained by the image pickup device 7. That is, the image signal obtained by the image pickup device 7 is subjected to predetermined processing by the signal processor 51, converted to digital data by the A/D conversion circuit 52, subjected to predetermined image processing by the digital signal processing circuit 50, and stored in the image memory 56.

Time-series image data items obtained by the image pickup device 7 and stored in the image memory 56 are sequentially and appropriately transferred by the total controller 101 to the VRAM 131 and further to the rear monitor 12, on which images based on the time-series image data items are displayed. Thus, movie-like display (live view display) for composition determination is realized.

The image pickup apparatus 1 also includes a communication I/F 133, which enables data communication with a device (e.g., personal computer) to which the communication I/F 133 is connected.

The image pickup apparatus 1 further includes a flash 41, a flash control circuit 42, and an AF auxiliary light emitting unit 43. The flash 41 is a light source used when the brightness of the subject is insufficient. The use and flash time of the flash 41 are controlled by the flash control circuit 42, total controller 101, and the like. The AF auxiliary light emitting unit 43 is an auxiliary light source for AF. The use and flash time of the AF auxiliary light emitting unit 43 is controlled by the total controller 101 and the like.

(1-3. Photographing Operation)

(Overview)

Next, a photographing operation including a composition determining operation in the image pickup apparatus 1 will be described. As described above, the image pickup apparatus 1 allows not only a composition determining operation (framing) through the use of an optical finder (also referred to as optical viewfinder (OVF)) constituted by a finder optical system and the like, but also a composition determining operation through the use of live view images displayed on the rear monitor 12 (described below). A finder function realized through the use of the image pickup device 7 and the rear monitor 12 is referred to as electronic viewfinder (EVF) function, since an optical image of the subject is made visible after being converted into electronic data.

As will be described below, by operating the selector dial 87, the operator can select whether to perform a composition determining operation through the use of the OVF or that through the use of the EVF.

Figure 4:
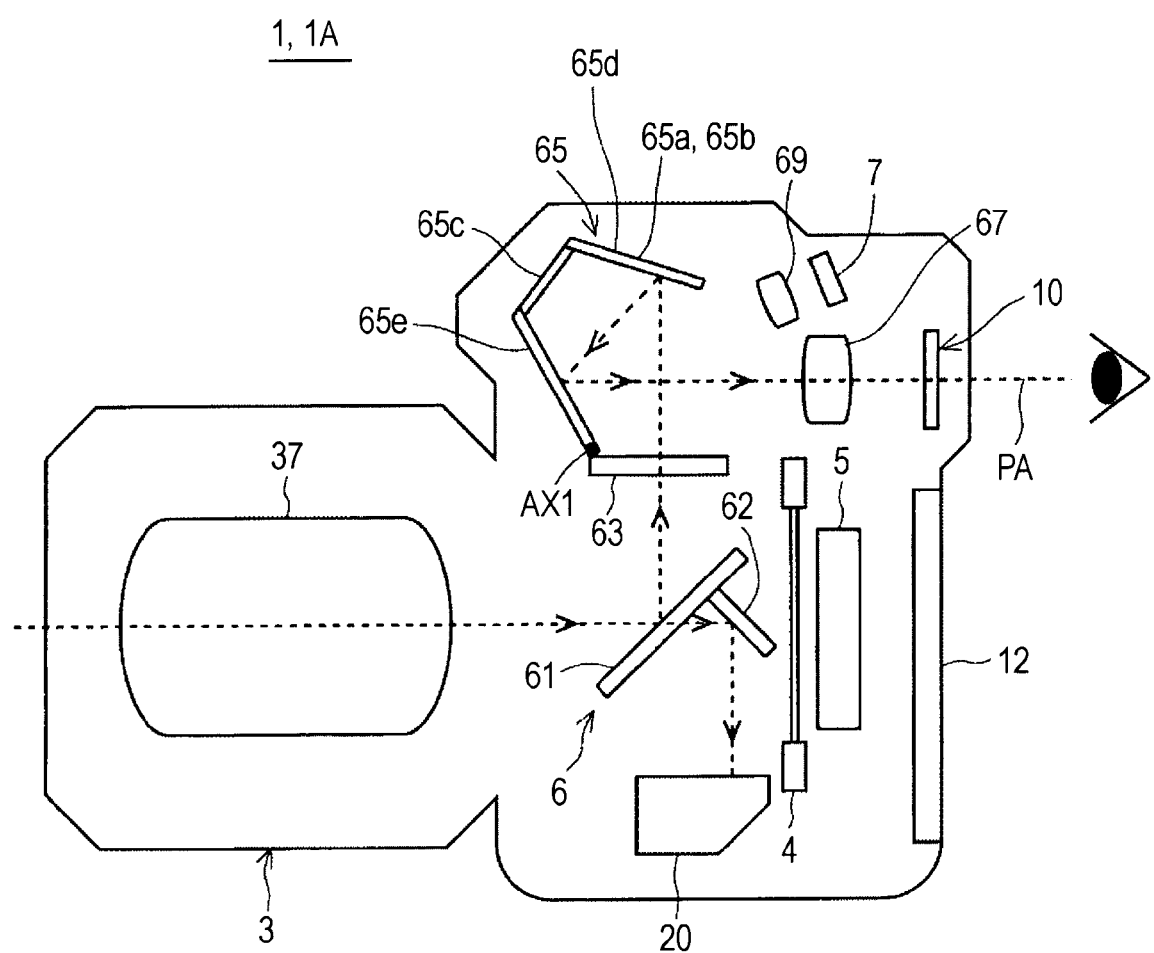
FIG. 4 is a cross-sectional view illustrating a composition determining operation through an optical viewfinder (OVF).
Figure 5:
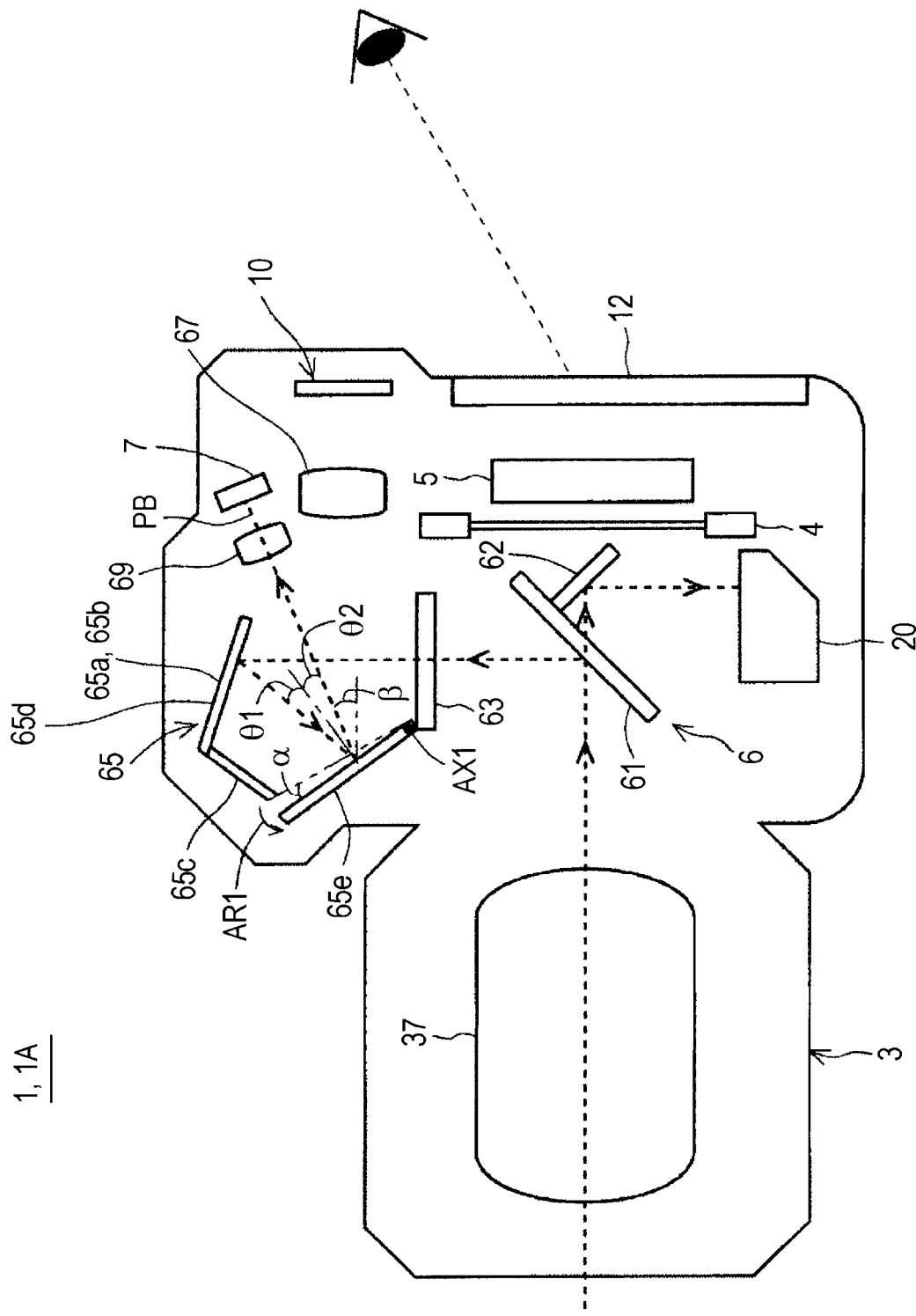
FIG. 5 is a cross-sectional view illustrating a composition determining operation through an electronic viewfinder (EVF).
Figure 6:
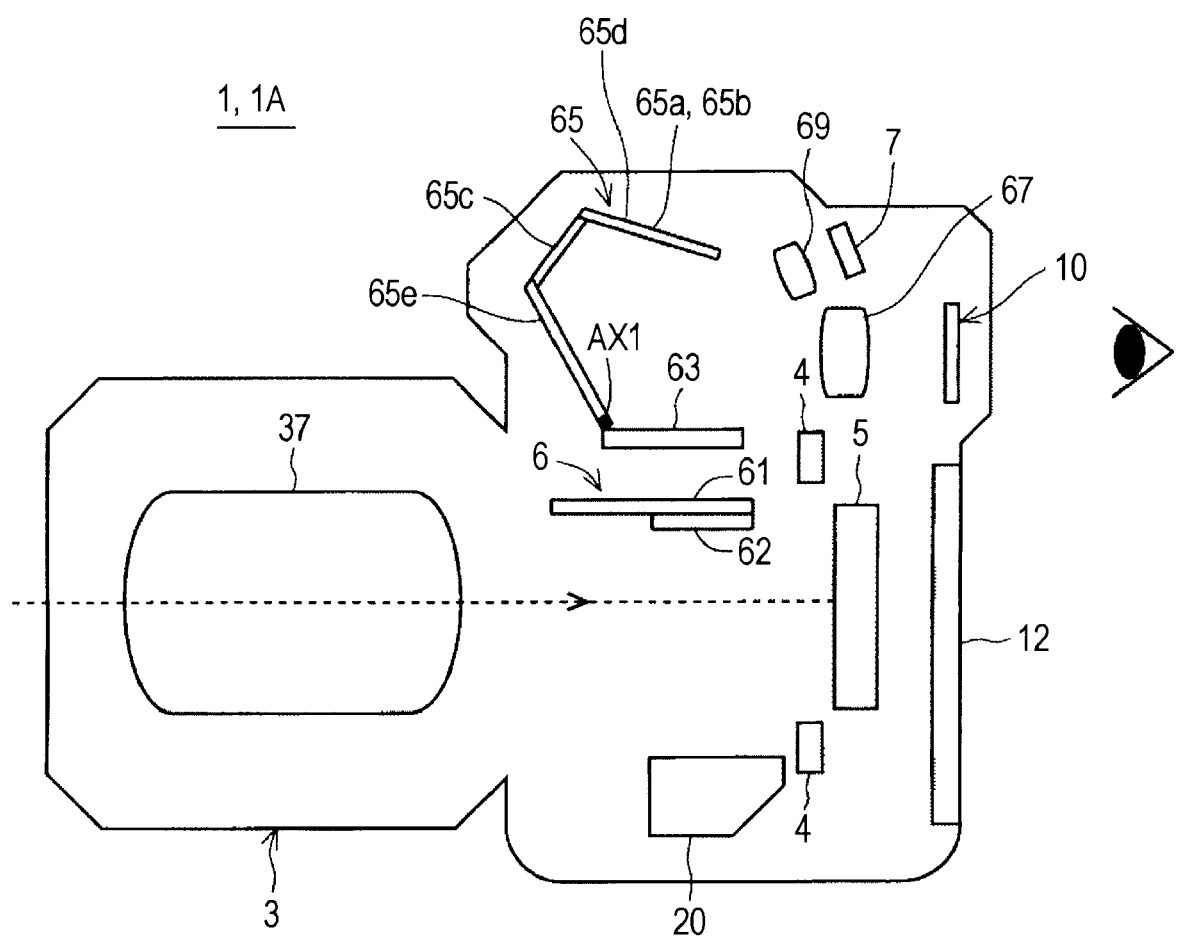
FIG. 6 is a cross-sectional view illustrating an exposure operation.

FIG. 4 and FIG. 5 are cross-sectional views of the image pickup apparatus 1. FIG. 4 illustrates a composition determining operation using the OVF, while FIG. 5 illustrates a composition determining operation using the EVF. FIG. 6 is a cross-sectional view illustrating a state during an exposure operation.

As illustrated in FIG. 4 and the like, the mirror assembly 6 is provided in the optical path (photographing optical path) extending from the photographing lens unit 3 to the image pickup device 5. The mirror assembly 6 includes a main mirror (main reflecting surface) 61 which reflects light from the photographing optical system upward. The main mirror 61 is, for example, partially or entirely configured as a half mirror and allows part of light from the photographing optical system to pass through. The mirror assembly 6 also includes a sub-mirror (sub-reflecting surface) 62 which reflects light having passed through the main mirror 61 downward. The light reflected downward by the sub-mirror 62 is guided to the AF module 20 and used in an AF operation based on a phase difference method.

The mirror assembly 6 is arranged to be in a mirror-down state during a composition determining operation (see FIG. 4 and FIG. 5), that is, until the release button 11 (see FIG. 1) is brought into a fully-pressed state (S2 state) in a photographing mode. During a composition determining operation, a subject image from the photographing lens unit 3 is reflected upward by the main mirror 61 and is incident as an observation beam on a pentamirror assembly 65. The pentamirror assembly 65 includes a plurality of sub-mirrors (reflecting surfaces) and has a function of adjusting the orientation of a subject image. As will be described below, a path of the observation beam incident on the pentamirror assembly 65 varies depending on which of the above-described methods (OVF and EVF methods) is used to perform composition determination. The operator can perform composition determination using a desired method.

When the release button 11 is brought into a fully-pressed state (S2 state), the mirror assembly 6 is driven to a mirror-up state. Then, an exposure operation is started (see FIG. 6). An operation for obtaining a subject's still image (also referred to as actual photographic image) to be recorded, that is, an operation during exposure is common to composition determination operations according to both the methods (OVF and EVF methods) described above.

Specifically, as illustrated in FIG. 6, the mirror assembly 6 is retracted from a photographing optical path during exposure. More specifically, the main mirror 61 and the sub-mirror 62 move away from the photographing optical path so as not to block light (subject image) from the photographing optical system. Then, when the shutter 4 opens, light from the photographing lens unit 3 reaches the image pickup device 5. On the basis of the detected beam, the image pickup device 5 generates an image signal of the subject by photoelectric conversion. Thus, a photographic image (photographic image data) of the subject can be obtained by guiding light from the subject through the photographing lens unit 3 to the image pickup device 5.

(Composition Determining Operation (Framing Operation) Using Optical Finder)

Composition determining operations according to both the above methods will be described.

First, a composition determining operation according to the OVF method will be described.

As illustrated in FIG. 4, when the main mirror 61 and sub-mirror 62 of the mirror assembly 6 are placed in the optical path of a subject image from the photographing lens unit 3, the subject image is guided through the main mirror 61, pentamirror assembly 65, and an eyepiece 67 to the finder window 10. Thus, the finder optical system including the main mirror 61, pentamirror assembly 65, and eyepiece 67 can guide an observation beam, which is a beam traveling from the photographing optical system and reflected off the main mirror 61, to the finder window 10.

More specifically, light from the photographing lens unit 3 is reflected and bent upward by the main mirror 61, focused on a focusing plate 63, and passes through the focusing plate 63. Then, the light having passed through the focusing plate 63 is further bent by the pentamirror assembly 65 and passes through the eyepiece 67 toward the finder window 10 (see a first optical path PA of FIG. 4). Thus, the subject image having passed through the finder window 10 reaches the photographer's (observer's) eye and is visually identified. In other words, the photographer can view the subject image by looking through the finder window 10.

Here, the pentamirror assembly 65 includes two mirrors (roof mirrors or roof surfaces) 65a and 65b (see also FIG. 7) formed in a triangular roof shape, a fixed surface 65c fixed to the roof mirrors 65a and 65b, and another mirror (reflecting surface) 65e. The roof mirrors 65a and 65b are formed as an integrated component 65d by plastic molding. Light reflected and bent upward by the main mirror 61 is further reflected by the roof mirrors 65a and 65b to be horizontally inverted, further reflected by the mirror 65e to be vertically inverted, and then reaches the photographer's eye. Thus, an optical image horizontally and vertically inverted in the photographing lens unit 3 is further horizontally and vertically inverted by the pentamirror assembly 65. Therefore, through the optical finder, the photographer can observe a subject image that is in the same horizontal and vertical orientations as those of the actual subject.

On the other hand, light having passed through the main mirror 61 is reflected and bent downward by the sub-mirror 62 and enters the AF module 20. The AF module 20, focus controller 121 (see FIG. 3), and the like use the light having entered through the main mirror 61 and sub-mirror 62 to realize an AF operation.

(Composition Determining Operation (Framing Operation) Using Electronic Finder)

Next, a composition determining operation according to the EVF method will be described.

As illustrated in FIG. 5, the main mirror 61 and sub-mirror 62 of the mirror assembly 6 are placed in the optical path of a subject image from the photographing lens unit 3. Light from the photographing lens unit 3 is reflected and bent upward by the main mirror 61, focused on the focusing plate 63, and passes through the focusing plate 63.

In the composition determining operation according to the EVF method, the light having passed through the focusing plate 63 is further bent by the pentamirror assembly 65, passes through an imaging lens (imaging optical system) 69, and is focused again on the image pickup surface of the image pickup device 7 (see a second optical path PB of FIG. 5). The light reflected and bent upward by the main mirror 61 is further reflected by the roof mirrors 65a and 65b to be horizontally inverted, further reflected by the mirror 65e to be vertically inverted, horizontally and vertically inverted again by the imaging lens 69, and then reaches the image pickup device 7.

Specifically, as will be understood by comparison with FIG. 4, the angle of the mirror 65e (i.e., the mounting angle of the mirror 65e with respect to the camera body 2) is changed in FIG. 5. More specifically, from the position illustrated in FIG. 4, the mirror 65e pivots by a predetermined angle α (see FIG. 5) about axis AX1 at its lower end in the direction indicated by arrow AR1. As will be described below, the mirror 65e pivots in response to an operation of the photographer.

This angle change of the mirror 65e changes the reflection angle of light (observation beam) reflected by the mirror 65e and thus changes the travel path of the light reflected by the mirror 65e. Specifically, an incident angle θ1 with respect to the mirror 65e and a reflection angle θ2 are made smaller than those in the case of FIG. 4. As a result, light reflected by the mirror 65e changes its path upward, that is, from an optical path directed toward the eyepiece 67 to an optical path adjacent to the roof mirrors 65a and 65b. Then, the light passes through the imaging lens 69 and reaches the image pickup device 7. The imaging lens 69 and the image pickup device 7 are disposed above the eyepiece 67 and at a position that does not block a beam traveling from the mirror 65e to the eyepiece 67 when the OVF method is used.

The path of the beam reflected by the mirror 65e is changed by an angle β that is double the pivoting angle α of the mirror 65e (i.e., β=2×α). In other words, since the path of the beam reflected by the mirror 65e is changed by the angle β, the pivoting angle of the mirror 65e can be made as small as α, which is half the angle β. That is, by slightly pivoting the mirror 65e, it is possible to greatly change the path of light reflected by the mirror 65e. Also, since the mirror 65e and the image pickup device 7 are arranged relatively far from each other, a beam reflected by the mirror 65e can be reliably guided to either one of the eyepiece 67 and the image pickup device 7 that are separate from each other only by slightly changing the pivoting angle of the mirror 65e. That is, by slightly changing the pivoting angle of the mirror 65e, it is possible to allow a beam of light reflected by the mirror 65e to preferably travel along either one of two different optical paths. Therefore, an increase in space caused by pivoting the mirror 65e can be minimized.

The image pickup device 7 generates live view images on the basis of subject images having been reflected by the mirror 65e, passed through the imaging lens 69, and reached the image pickup device 7. Specifically, the image pickup device 7 sequentially generates a plurality of images at very short time intervals (e.g. 1/60 second). Then, the obtained time-series images are sequentially displayed on the rear monitor 12. Thus, the photographer can visually check moving images (live view images) displayed on the rear monitor 12 and determine the composition using the moving images.

As in the case of the composition determination through the use of the OVF (see FIG. 4), light that has passed through the main mirror 61 and sub-mirror 62 and been incident on the AF module 20 is used to perform an AF operation.

As described above, by changing the reflection angle of the mirror 65e, the path of an observation beam reflected by the mirror 65e can be switched between the first optical path PA (see FIG. 4) extending from the mirror 65e toward the eyepiece 67 and finder window 10 and the second optical path PB (see FIG. 5) extending from the mirror 65e toward the imaging lens 69 and image pickup device 7. In other words, by changing the reflection angle of the mirror 65e, the path of the observation beam can be switched between the first optical path PA reflected from the mirror 65e and directed toward the finder window 10 and the second optical path PB reflected from the mirror 65e and directed toward the image pickup device 7.

Therefore, with the image pickup apparatus 1, it is possible to realize live view display without arranging, in an optical path near the eyepiece 67 of the finder optical system, a reflecting mirror movable back and forth with respect to an optical path of a subject image, as is the case with the known technique. In other words, the image pickup apparatus 1 makes it possible to realize live view display with a compact structure.

In the known technique described above, the amount of light reaching a finder window is considerably reduced, since an observation beam is split by a beam splitter (or half mirror) into a component directed toward an image pickup device for live view display and a component directed toward the finder window. However, the image pickup apparatus 1 allows the photographer to view a brighter subject image through an optical finder by preventing or reducing the reduction in the amount of light at the optical finder.

Additionally, of the plurality of mirrors 65a, 65b, and 65e constituting the pentamirror assembly 65 in the image pickup apparatus 1, the reflection angle of one reflecting surface (mirror 65e) is changed while the other reflecting surfaces (roof mirrors 65a and 65b) are fixed in position. In other words, the path of an observation beam is changed by driving the reflecting surface 65e alone. Therefore, since the size of the driven portion is small, it is possible to achieve a compact structure.

Also in the image pickup apparatus 1, since the reflection angle of only the mirror 65e is changed to change the path of the observation beam, it is possible to change the path of the observation beam more easily than in the case where the roof mirrors 65a and 65b are driven.

(Mechanism of Switching Between Both Operations)

Next, a switching operation for switching between a composition determining operation through the OVF and that through the EVF will be described.

Figure 7:
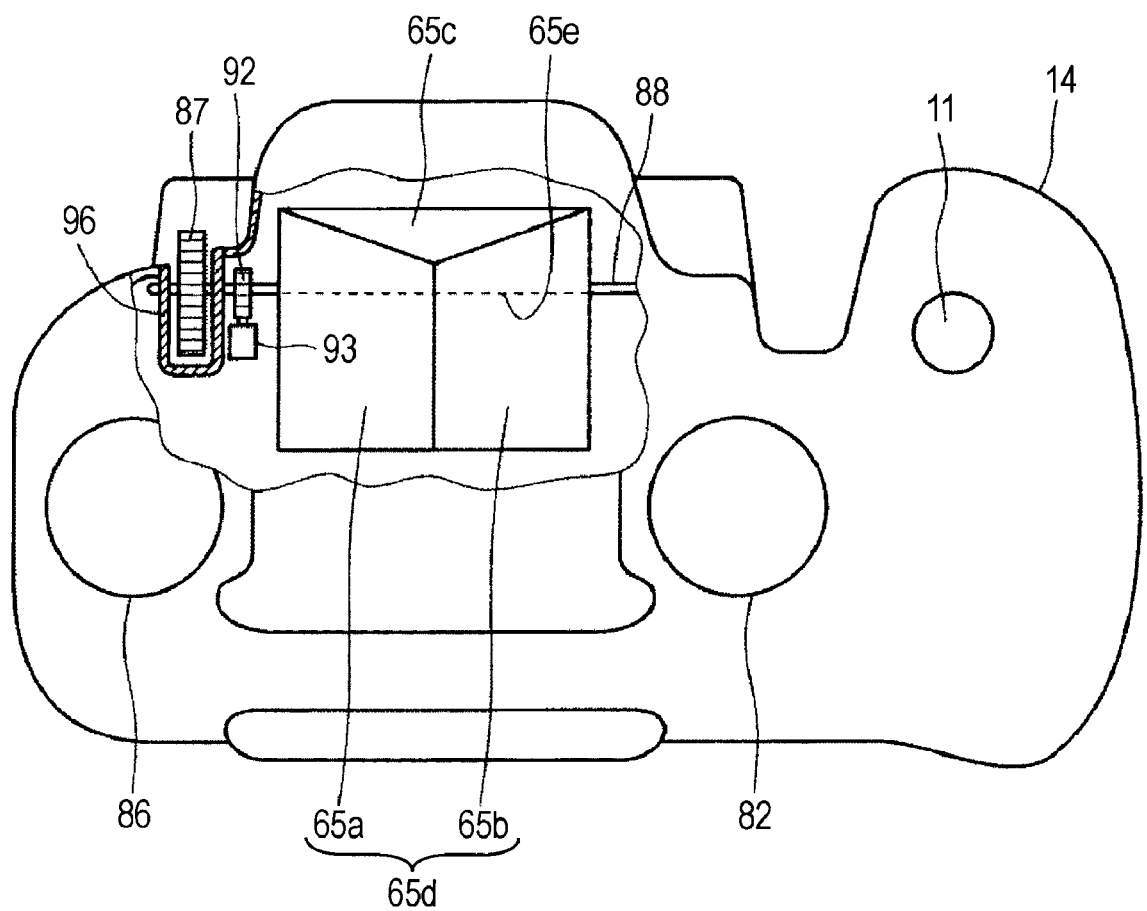
FIG. 7 is a top view of the image pickup apparatus.
Figure 8:
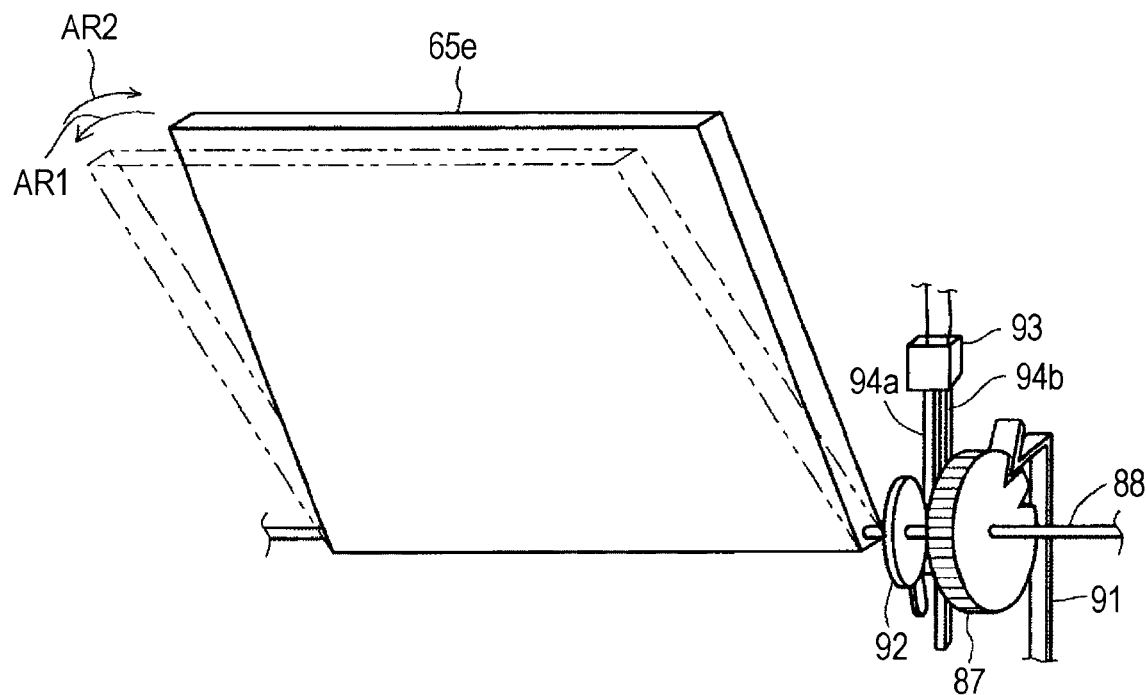
FIG. 8 is a schematic diagram illustrating a driving mechanism for driving a mirror that can change its angle.

FIG. 7 is a top view of the image pickup apparatus 1 and is also a cutaway view of the inside of the image pickup apparatus 1. FIG. 8 is a schematic diagram illustrating a driving mechanism (angle changing mechanism) for driving the mirror 65e.

As illustrated in FIG. 8, the mirror 65e, which is rectangular in shape, is provided such that it is pivotable about an axis that is substantially parallel to its longitudinal direction. More specifically, at the lower end of the mirror 65e, a shaft member 88 extends through a through hole provided along the lower side of the mirror 65e and is fixed to the mirror 65e. The shaft member 88 is supported at both ends such that the mirror 65e is pivotable (swingable) thereabout.

At the same time, the selector dial 87 and a rotor 92 are fixed to the shaft member 88.

As illustrated in FIG. 7, the selector dial 87 partially protrudes from the outer surface of the camera body 2 of the image pickup apparatus 1. Therefore, the photographer can use this protruding part to rotate the selector dial 87. To prevent dust from entering the image pickup apparatus 1 from a region around the selector dial 87, a partition wall 96 is provided around the selector dial 87.

Figure 9:
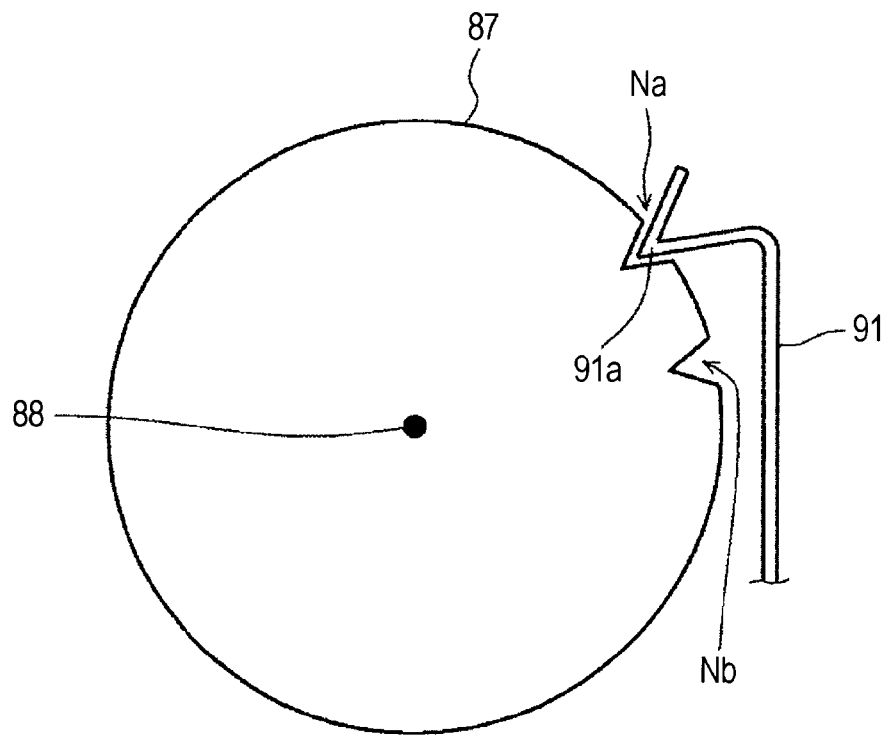
FIG. 9 illustrates a structure of a selector dial.

FIG. 9 illustrates a structure of the selector dial 87. As illustrated, two notches Na and Nb are provided in the rim of the selector dial 87. An elastic member 91 is provided outside the selector dial 87. A bent portion 91a near an end of the elastic member 91 is pressed against the rim of the selector dial 87 with appropriate elastic force, and is relatively movable along the rim of the selector dial 87 as the selector dial 87 rotates. The bent portion 91a of the elastic member 91 is engaged with one of the notches Na and Nb. This makes it possible to fix the position of the selector dial 87 in its rotation direction. When the bent portion 91a is engaged with the notch Na, a composition determining operation through the OVF is performed. When the bent portion 91a is engaged with the notch Nb, a composition determining operation through the EVF is performed.

The photographer operates the selector dial 87 to allow the mirror 65e to pivot in the direction of arrow AR1 (see FIG. 8)

and come into engagement with the notch Nb (see FIG. 9). This makes it possible to perform a composition determining operation through the EVF. On the other hand, if the photographer operates the selector dial 87 to allow the mirror 65e to pivot in the direction of arrow AR2 (see FIG. 8) and come into engagement with the notch Na (see FIG. 9), a composition determining operation through the OVF can be performed.

Figure 10:
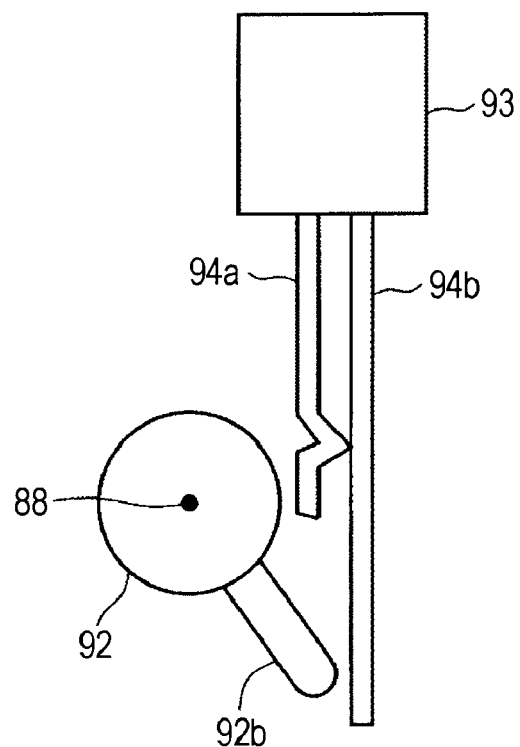
FIG. 10 illustrates a detection state in a composition determining operation through the OVF.
Figure 11:
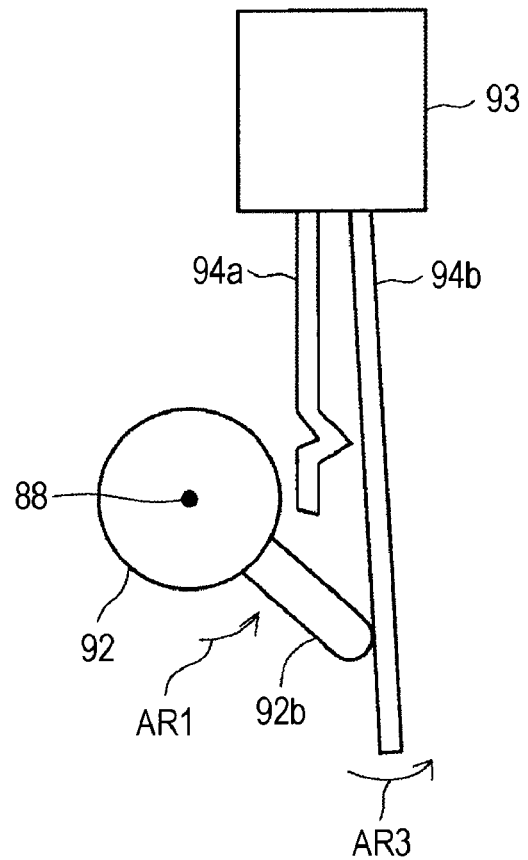
FIG. 11 illustrates a detection state in a composition determining operation through the EVF.

The rotor 92 and a detector 93 are provided for detecting the angle of the mirror 65e. As illustrated in FIG. 10, in a composition determining operation through the OVF, electric connectors 94a and 94b are in contact with each other and in conduction (i.e., in an ON state). On the other hand, as illustrated in FIG. 11, in a composition determining operation through the EVF, a force in the direction of arrow AR3 is applied by a protrusion 92b of the rotor 92 to the electric connector 94b as the shaft member 88 rotates. This causes the electric connector 94b to be deformed rightward in FIG. 11. As a result, the electric connector 94b is separated from the electric connector 94a and thus, the electric connectors 94a and 94b are brought out of conduction (i.e., brought into an OFF state). The detector 93 detects these two states (ON state and OFF state) to detect the angle of the mirror 65e.

On the basis of the detection performed by the detector 93, the total controller 101 determines which of the OVF and EVF is to be used to perform a composition determining operation. More specifically, if the ON state of the detector 93 is detected, the total controller 101 determines that a composition determining operation through the OVF is to be performed and carries out necessary tasks, such as stopping supplying power to the image pickup device 7 and disabling the rear monitor 12. On the other hand, if the OFF state of the detector 93 is detected, the total controller 101 determines that a composition determining operation through the EVF is to be performed and carries out necessary tasks, such as supplying power to the image pickup device 7 and displaying live view images on the rear monitor 12.

2. Second Embodiment

A second embodiment of the present invention is a modification of the first embodiment. Therefore, differences from the first embodiment will be primarily described below.

Figure 12:
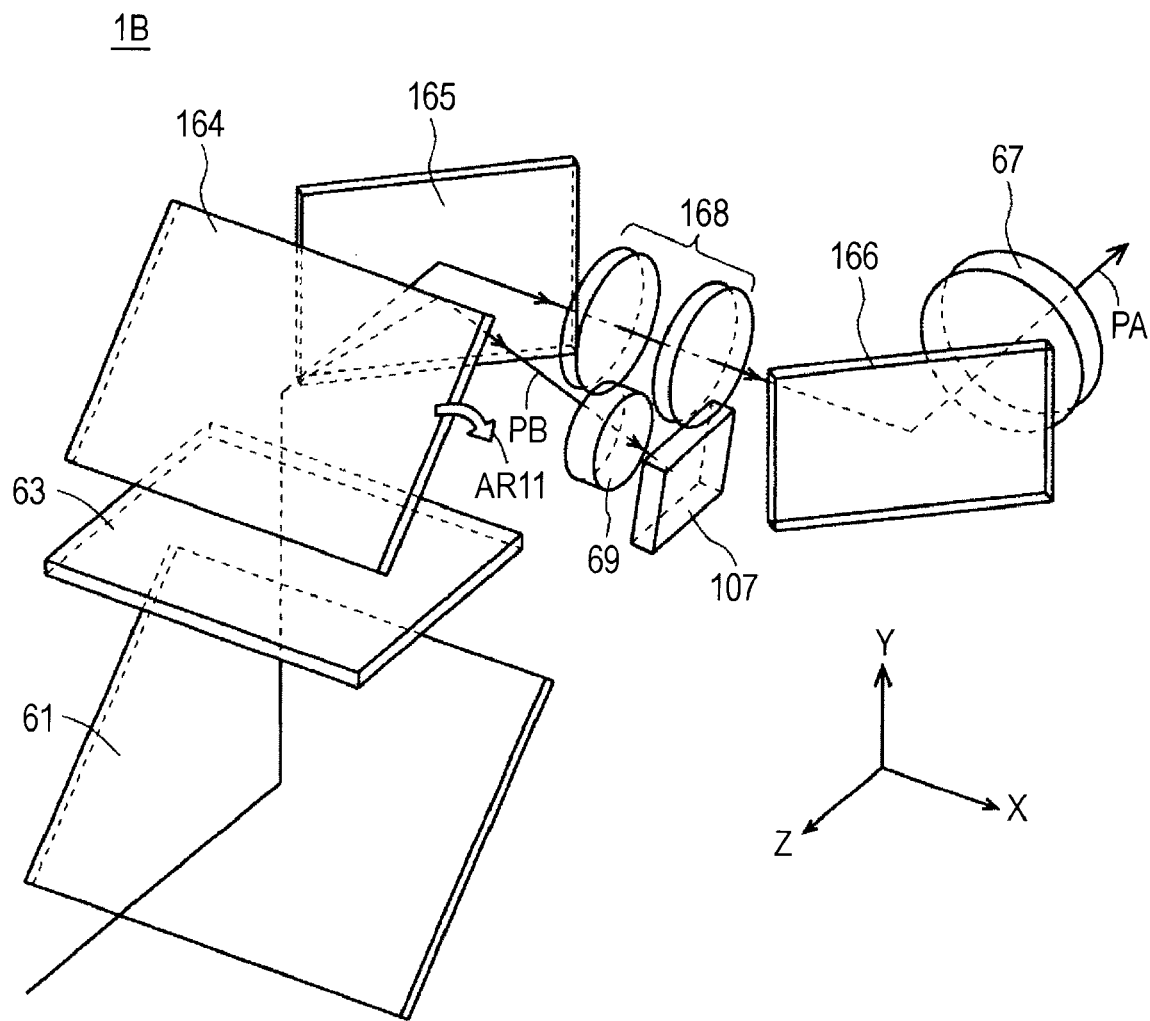
FIG. 12 is a schematic diagram illustrating an image pickup apparatus according to a second embodiment of the present invention.

FIG. 12 is a conceptual diagram primarily illustrating a finder optical system of an image pickup apparatus 1B according to the second embodiment.

As illustrated in FIG. 12, this finder optical system includes three mirrors (reflecting plates) 164, 165, and 166 and a relay lens 168, instead of the pentamirror assembly 65.

When a composition determining operation through the OVF is to be performed, light from the photographing lens unit 3 is reflected and bent upward by the main mirror 61, focused on the focusing plate 63, and passes through the focusing plate 63. The light having passed through the focusing plate 63 is bent by the mirror 164 to a horizontal direction (−Z direction in FIG. 12), reflected and bent to a rightward direction (+X direction in FIG. 12) by the mirror 165, passes through the relay lens 168, bent by the mirror 166 (in the −Z direction in FIG. 12), passes through the eyepiece 67, and reaches the photographer's (observer's) eye (see a first optical path PA of FIG. 12). The relay lens 168 is capable of horizontally and vertically re-inverting an optical image. Therefore, an optical image horizontally and vertically inverted by the photographing lens unit 3 is horizontally and vertically inverted again by the relay lens 168. Thus, the photographer can observe a subject image in a normal state through an optical finder.

On the other hand, when a composition determining operation through the EVF is to be performed, the mirror 164 rotates in the direction of arrow AR11 about an axis parallel to an X-axis. Thus, the angle of the mirror 164 is changed.

In this case, light reflected by the main mirror 61, traveling upward, and having passed through the focusing plate 63 is reflected by the mirror 164 with its angle changed, moves away from the horizontal direction (−Z direction in FIG. 12) toward the −Y side, passes through the imaging lens 69, and reaches an image pickup device 107 (see a second optical path PB of FIG. 12). The imaging lens 69 and the image pickup device 107 are disposed under the relay lens 168 (i.e., disposed to the −Y side of the relay lens 168).

A mechanism similar to that used for changing the angle of the mirror 65e can be used for changing the angle of the mirror 164.

As described above, by changing the reflection angle of the mirror 164, the path of an observation beam guided to the finder optical system may be switched between the first optical path PA reflected by the mirror 164 and directed through the eyepiece 67 toward the finder window 10 and the second optical path PB reflected by the mirror 164 and directed toward the image pickup device 107.

3. Modifications

The present invention is not limited to the embodiments described above.

For example, although the first embodiment illustrates the mirror 65e that is pivotable about the axis AX1 at its lower end, the mirror 65e may pivot about an axis at its upper end.

The angle of the mirror 65e may be changed by combining rotation and translation operations using a crank mechanism or the like. More specifically, the angle of the mirror 65e may be changed by moving the mirror 65e in a back and forth direction of the image pickup apparatus 1 along a central axis passing through the center of the vertical direction of the mirror 65e while rotating the mirror 65e about the central axis.

Alternatively, the mirror 65e, which is rectangular in shape, may be rotated about an axis substantially parallel to its short side, not its long side. For example, the mirror 65e may be arranged to be pivotable about its short side, while the imaging lens 69 and the image pickup device 7 may be arranged to the left (or right) of the eyepiece 67. However, if the mirror 65e is made rotatable about an axis substantially parallel to its long side, it is possible to reduce space corresponding to a movable range necessary for rotation of the mirror 65e.

Similar modifications can be made to the second embodiment, that is, to the angle change of the mirror 164.

Although the second embodiment illustrates the case where the reflection angle of the mirror 164 is changed, the present invention is not limited to this. The reflection angle of the mirror 165 may be changed instead. For example, the reflection angle may be changed by rotating the mirror 165 about the Y-axis. In this case, the imaging lens 69 and the image pickup device 107 may be arranged to the +Z side (or −Z side) of the relay lens (relay optical system) 168, not to the −Y side of the relay lens 168.

Additionally, although the first embodiment illustrates the case where the reflection angle of only the mirror 65e, which is one of a plurality of reflecting surfaces included in the pentamirror assembly 65 in the finder optical system, is changed to bend the path of an observation beam, the present invention is not limited to this. For example, the roof mirrors 65a and 65b, which are the other reflecting surfaces included in the pentamirror assembly 65, may be rotated to bend the path of an observation beam.

Each of the above embodiments illustrates the case where the reflection angle of one reflecting surface (mirror 65e or 164) among the plurality of reflecting surfaces (mirrors 65a, 65b, and 65e or mirrors 164, 165, and 166) constituting a finder optical system is changed, while the other reflecting surfaces (roof mirrors 65a and 65b or mirrors 165 and 166) are fixed. However, the present invention is not limited to this. For example, the path of an observation beam may be changed by rotating a plurality of reflecting surfaces.

Additionally, although each of the above embodiments illustrates the case where the angle of the mirror 65e (or 164) is changed manually (i.e., using physical operational power of the photographer), the present invention is not limited to this. For example, a driving device, such as a motor, may be used to change the angle of the mirror 65e (or 164) and the like.

Each of the above embodiments illustrates the case where the present invention is applied to a digital camera. However, the present invention is not limited to this and is also applicable to a film camera. Specifically, without providing the image pickup device 5, an image pickup surface of a film may be arranged at the position of that of the image pickup device 5.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   a finder optical system configured to guide an observation beam to a finder window, the observation beam being a beam traveling from a photographing optical system and reflected by a main reflecting surface; and
   a first image pickup device configured to detect the observation beam and generate an image signal,
   wherein the finder optical system has a first reflecting surface that is one of a plurality of reflecting surfaces included in a pentamirror assembly of the finder optical system and reflects the observation beam;
   the first reflecting surface can change a reflection angle of the observation beam; and
   a path of the observation beam can be switched between a first optical path and a second optical path by changing the reflection angle of the first reflecting surface,
   wherein the first optical path is reflected by the first reflecting surface and directed toward the finder window, while the second optical path is reflected by the first reflecting surface and directed toward the first image pickup device, and an angle difference between the first optical path and the second optical path is equal to twice the difference between the reflection angle of the first reflecting surface for the first optical path and the second optical path.

2. The image pickup apparatus according to claim 1, wherein, of the plurality of reflecting surfaces included in the pentamirror assembly of the finder optical system, the first reflecting surface is a reflecting surface other than roof surfaces.

3. The image pickup apparatus according to claim 2, wherein the first image pickup device is disposed above an eyepiece of the finder optical system; and
   the first reflecting surface is pivotable about an axis at a lower end thereof.

4. The image pickup apparatus according to claim 1, wherein the first reflecting surface is pivotable about an axis substantially parallel to a longitudinal direction thereof.

5. The image pickup apparatus according to claim 1, wherein the finder optical system has a plurality of reflecting surfaces that reflect the observation beam; and
   of the plurality of reflecting surfaces, reflecting surfaces other than the first reflecting surface are fixed in position.

6. The image pickup apparatus according to claim 1, further comprising:
   a sub-reflecting surface configured to guide part of light having passed through the main reflecting surface to an autofocus sensor,
   wherein in composition determination, an autofocus operation using the autofocus sensor can be performed.

7. The image pickup apparatus according to claim 1, further comprising:
   a second image pickup device configured to detect a beam from the photographing optical system and generate an image signal, with the main reflecting surface retracted from a photographing optical path.

8. The image pickup apparatus according to claim 1, further comprising:
   a display unit configured to display time-series images obtained by the first image pickup device as live view images.

* * * * *